Patented Nov. 29, 1938

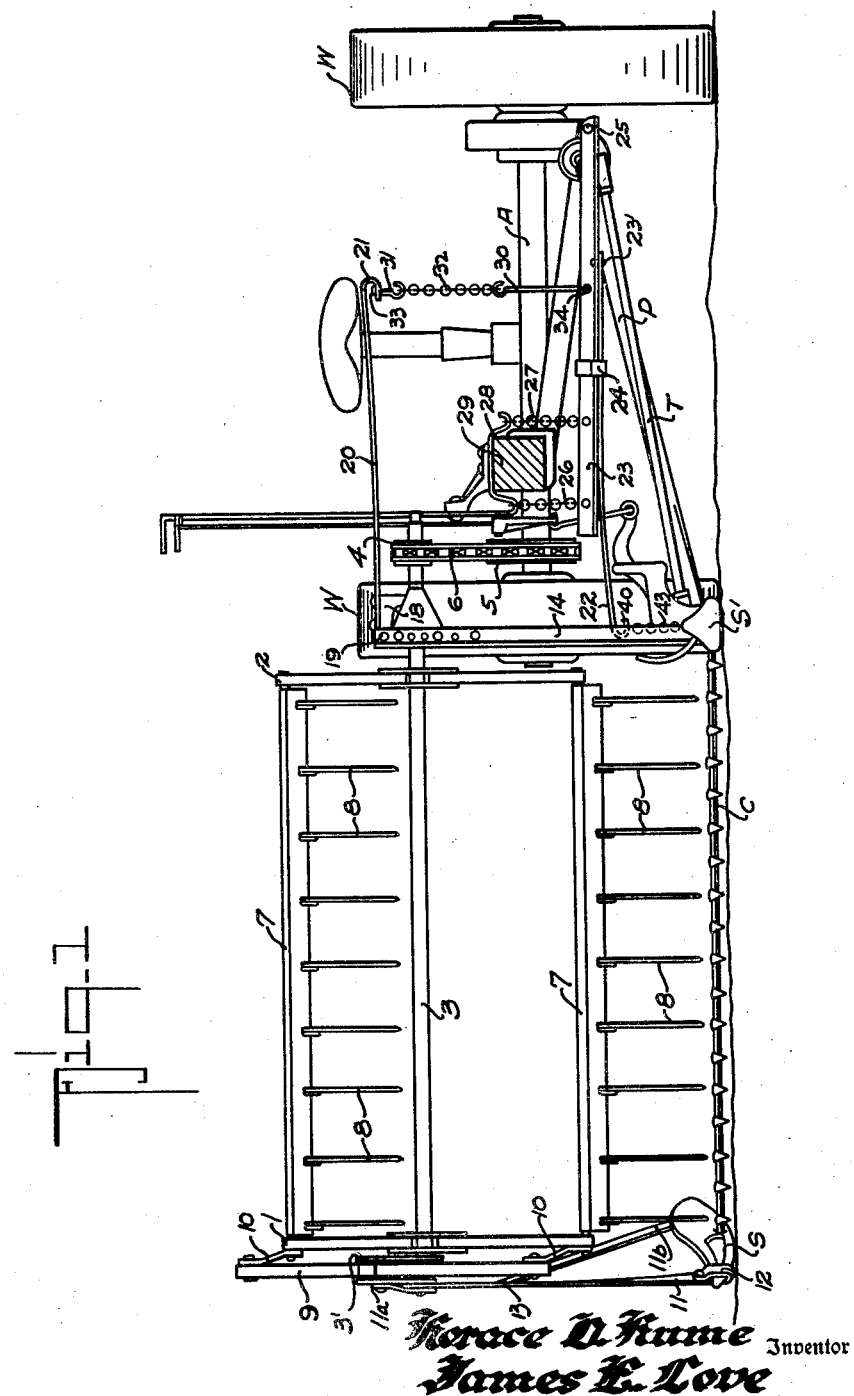

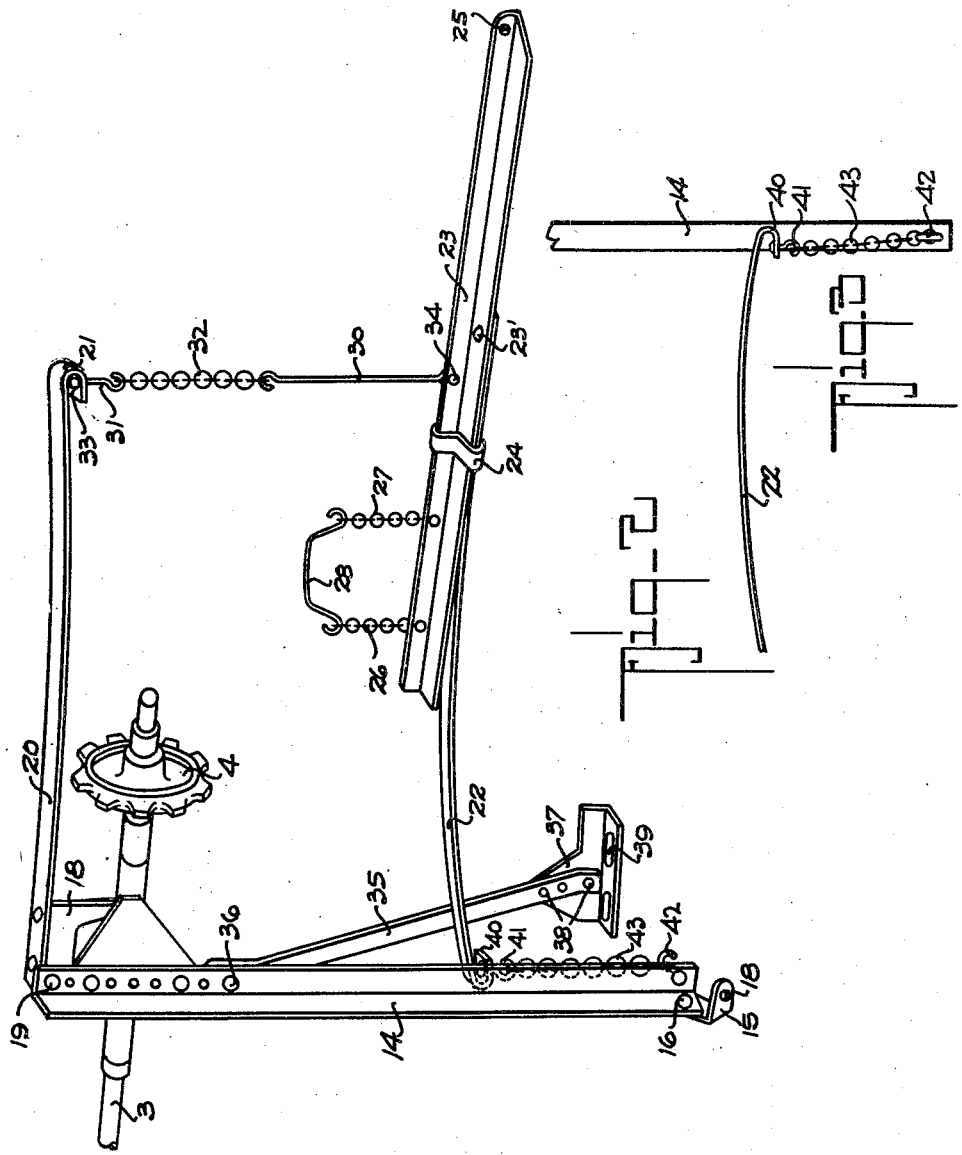

2,138,238

UNITED STATES PATENT OFFICE 2,138,238

HARVESTING MACHINE

Horace D. Hume and James E. Love, Garfield, Wash., assignors to Hume-Love Company, Garfield, Wash., a corporation Application April 16, 1937, Serial No. 137,199

9 Claims. (Cl. 56—219)

Our present invention relates to improvements in harvesting machines of the adjustable, reciprocating, side-cutter type, and employing a lifting reel for the grain or other crop to be harvested, and more particularly to the support for the reel.

In carrying out our invention we provide a support for the rotary reel of the harvesting machine, which support is adapted to distribute the weight of the reel upon the mower or other type of prime mover.

We have found that the reels, which must of necessity be manufactured of substantial material, when made in extra lengths as from 8 to 10 feet, impose a heavy load upon the shoes which support the cutter-bar and the shoes thus tend to penetrate into the ground, thereby retarding the progress of the machine.

In the present invention we employ a grain lifting reel described and claimed in our pending application, Serial Number 81,418, filed May 23, 1936, for Harvesting machines, and the object of the present invention is to provide a resilient support, or equalizing frame, for the reel of this prior disclosure for use especially when said reel is manufactured in extra lengths. When the reel is of standard length and comparatively light in weight, our support may be used if desired, although it is not essentially necessary.

This present invention consists primarily in the means for supporting both the inner and outer ends of the reel, upon the mower, in a resilient manner, thereby removing the weight of the reel from the cutter-bar and its shoes.

In the accompanying drawings we have shown one example of the physical embodiment of our invention in which the parts are combined and arranged according to one mode we have thus far devised for the practical application of our invention, but it will be understood that changes and alterations in the exemplified structure may be made within the scope of the appended claims without departing from the principles of our invention.

In the drawings:

Figure 1 is a front elevation of a harvester or mower showing our reel support.

Figure 2 is an enlarged detail view of the reel support according to our invention.

Figure 3 is a detail view of the manner of attaching one of the resilient supporting arms of the reel support of our invention.

In the exemplified structure we have illustrated a mower which supplies the motive power for the implement having the driving wheels W—W, and operably mounted upon the mower we utilize a conventional grain cutter-bar as C. The cutter bar C receives its power through the shaft T and the pitman P in power-transmitting engagement with the axle A of the mower.

Upon the ends of the cutter-bar C we mount supporting shoes S and S' which glide along the surface of the ground and support the cutter-bar in operating position.

Above the cutter-bar C we employ a harvesting reel (referred to hereinbefore) comprising the spaced spiders 1 and 2 secured upon the drive shaft 3. This drive shaft 3 is operably connected to the axle A of the mower by means of sprocket wheels 4 and 5, and the sprocket chain 6. The spiders 1 and 2 are connected by tine bars 7 upon which are mounted tines 8.

Outside the spider 1, the shaft 3 is provided with a crank 3', and journaled on this crank, eccentrically of the shaft 3, we utilize a rotary frame 9 which is pivotally connected at intervals to spider 1 by levers 10. By rotation of this frame in relation to the spiders 1 and 2, the pitch of the tines may be varied.

The reel is supported on the shoe S of the cutter-bar C by means of an upright standard 11 provided at its lower end with a loop 12 that is slipped over the end of the shoe S and is retained in position by frictional contact. At its upper end the standard 11 is secured to the rotary frame 9, as at 11a. We also utilize a diagonal brace 11b, bolted to the standard 11 as at 13, and secured to the rear portion of the shoe S.

We have found that the weight of an elongated reel depresses or urges the shoes into the ground, and thus tends to retard the advance of the cutter, and in order that such objectionable conditions may be prevented, we have provided a spring mount, or equalizer for the reel mounted on the mower and connected with the inner end of the reel, but capable of supporting both the inner and outer ends of the reel.

As best seen in Figure 2 we employ a vertical standard 14 which is provided at its lower end with an angle iron 15 that is secured to the standard 14 by means of bolt 16, and the angle iron 15 is also secured to the shoe S' by means of a bolt (not shown) adapted to penetrate the opening 17 in the angle iron 15.

At the upper end of the standard 14 we secure an L-shaped angle support 18 to which the standard 14 is bolted through one of the series of holes as at 19. On the horizontal surface of the angle support 18 we have mounted a spring arm 20 formed with a U-shaped end 21.

Below the arm 20 we utilize another spring arm 22 which has adjacent one of its ends, a horizontal angle extension or bar 23 that is riveted or bolted at 23'. The free end of the arm 22 is formed U-shaped as at 40 and supports an attaching hook 41. The lower end of standard 14 has bolted or riveted thereto hook 42 and a chain 43, forming an adjustable and flexible connection is engaged by means of the links to the hooks 41 and 42.

A laterally adjustable clip 24 is mounted upon the angle extension or bar 23 and this clip embraces and clasps the arm and bar together. By moving the clip toward or from the rivet 23' the resiliency of the spring arm 22 may be increased or decreased as desired. The rigid angle arm 23 is alined with the spring arm 22, and one end of the arm 23 is pivotally supported at 25 on the mower frame.

Adjacent the free end of the longitudinal extension bar 23 we provide for the attachment of chains 26 and 27 suspended on the hooked ends of a balance 28, which in turn is seated upon or supported by the tongue 29 of the mower.

We also provide for a flexible connection between the spring arms 20 and 22 as by the link 30 and hook 31, and the chain 32. The link, hook, and chain, forming the flexible connection, are secured upon spring arms 20 and 22, respectively as at 33 and 34.

A diagonal brace 35 is also employed for the standard 14, and this brace bears against the standard as at 36. The lower end of the brace 35 is provided with an angular bracket 37 secured thereto as at 38, and the bracket has slots cured thereto as at 38, and the brackets has slots or openings 39 by means of which the brace and bracket may be rigidly bolted upon the rear part of the shoe S'.

It will be seen that the spring arm 20 acts as a support for the outer end of the reel, and the spring arm 22 acts as a support for the inner end of the reel, and the two spring arms being flexibly connected together, will tend to balance and equalize each other, and maintain the reel in the most efficient operating position.

Thus by the utilization of the supporting frame of our invention at the inner end of the reel, we have removed most of the weight of the reel, from the shoes of the cutter-bar, and distributed the weight upon the mower. The shoes are thus free to glide over the ground and there is, therefore, no tendency for the shoes to penetrate into the ground thereby enabling the harvesting machine to operate smoothly, regardless of the length or weight of the reel employed, whether of standard length, or of extra length.

Having thus fully described our invention, what we claim as new and desire to secure by Letters Patent is:

1. The combination in a harvester having a cutter-bar and rotary reel, of a substantially rectangular frame having two resilient sides supporting said cutter-bar and reel on said harvester.

2. The combination in a harvester having a cutter-bar and rotary reel, of a substantially rectangular, resilient frame supporting said cutter-bar and reel on said harvester, and means movable along one side of said rectangular frame for varying the resiliency of said frame.

3. The combination in a harvester machine having a cutter-bar and rotary reel, of a standard mounted on said cutter-bar, a spring arm extending transversely from said standard, a laterally extending bar having one end pivoted to said machine and the other end supported from said machine, said bar being alined with said spring arm and connected therewith, at the free end of the arm, and means for varying the resiliency of said spring arm.

4. The combination with a harvester machine having a cutter-bar and rotary reel, of a standard mounted on said cutter-bar, a spring arm connected with said standard, a bar having one end pivoted to said machine and the other end supported from said machine, said bar being alined with said spring arm and connected therewith, and an adjustable clip on said arm and bar for varying the resiliency of said spring arm.

5. The combination in a harvester machine having a cutter-bar and rotary reel, of a standard mounted on said cutter-bar, a spring arm extending transversely from the upper end of said standard, a second spring arm adjustably attached to said standard at the lower end of said standard, a laterally extending bar having one end pivoted to said machine and the other end supported from said machine, said bar being alined with said second spring arm and connected therewith, and means for varying the resiliency of said second spring arm.

6. In a harvester the combination with a cutter-bar and rotary reel, of a standard mounted on said cutter-bar, a spring arm secured to the upper end of said standard, a second spring arm secured to said standard at its lower end, a transverse bar having one end pivoted to said harvester and the other end supported from said harvester, said bar being alined with said second spring arm and connected therewith, an adjustable clip on said arm and bar between said connection and said supported end of said bar for varying the resiliency of said arms.

7. The combination in a harvester machine having a cutter-bar and rotary reel, of a standard mounted on said cutter-bar and forming one side of a substantially rectangular resilient frame supporting said cutter-bar and reel on said machine, and means for varying the resiliency of said frame.

8. The combination in a resilient supporting frame for a harvester of the rotary-reel and side cutter type, with a standard, an upper spring arm and a lower spring arm, and a flexible connection between said arms, of a rigid bar forming an extension of the lower arm, and means adjustable on said lower arm and bar for varying the resiliency of the frame.

9. The combination in a resilient supporting frame for a harvester of the rotary-reel and side cutter type, with a standard, an upper spring arm and a lower spring arm, and a flexible connection between said arms, of a rigid bar forming an extension of the lower arm, the opposite ends of said bar each having a support on the harvester, and means adjustably on said lower arm and bar for varying the resiliency of the frame.

HORACE D. HUME.
JAMES E. LOVE.